United States Patent [19]

Smith

[11] Patent Number: 5,074,616
[45] Date of Patent: Dec. 24, 1991

[54] WEATHER SHIELD FOR INFANT'S SEAT

[76] Inventor: Jerry N. Smith, 2810 Piper Rd., Springfield, Ill. 62707

[21] Appl. No.: 537,242

[22] Filed: Jun. 13, 1990

[51] Int. Cl.$^5$ .............................................. A47C 7/62
[52] U.S. Cl. ........................................ 297/184; 5/416
[58] Field of Search .................... 297/184, 218; 5/418, 5/414, 415, 416; 135/117, 91, 92, 93

[56] References Cited

U.S. PATENT DOCUMENTS

| | | | |
|---|---|---|---|
| 778,330 | 12/1904 | Pond | 5/416 X |
| 860,379 | 7/1907 | Hodes | 5/416 X |
| 1,732,878 | 10/1929 | Collender | |
| 2,218,043 | 10/1940 | Lilleberg | |
| 2,546,843 | 3/1951 | Zigterman | |
| 4,198,996 | 4/1980 | Keable et al. | 135/117 X |
| 4,232,898 | 11/1980 | Bodrero | 297/219 |
| 4,314,727 | 2/1982 | Potts | 297/184 |
| 4,320,744 | 3/1982 | Fodor al. | 135/97 X |
| 4,579,385 | 4/1986 | Koenig | |
| 4,627,659 | 12/1986 | Hall | 297/184 X |
| 4,634,177 | 1/1987 | Meeker | 297/183 X |
| 4,739,784 | 4/1988 | Fast | 135/117 |
| 4,785,838 | 11/1988 | Negahdari | |

Primary Examiner—Jose V. Chen
Attorney, Agent, or Firm—Grace J. Fishel

[57] ABSTRACT

A weather shield for an infant's seat such as a baby carrier, of a well known type having a carrying handle, formed as a shell into which an infant is seated. The weather shield is easy to use and comfortable for the baby including in main part an elongated panel to which triangular side panels are attached. A front section of the elongated panel is transparent permitting the baby to see and be seen. The elongated panel is made of a sheet material capable of shedding water, as are the side panels when the weather is intended for winter use. Snaps or the like are provided for attaching the weather shield to the infant's seat such that it cannot be readily displaced by the wind or by the infant.

8 Claims, 1 Drawing Sheet

U.S. Patent — Dec. 24, 1991 — 5,074,616
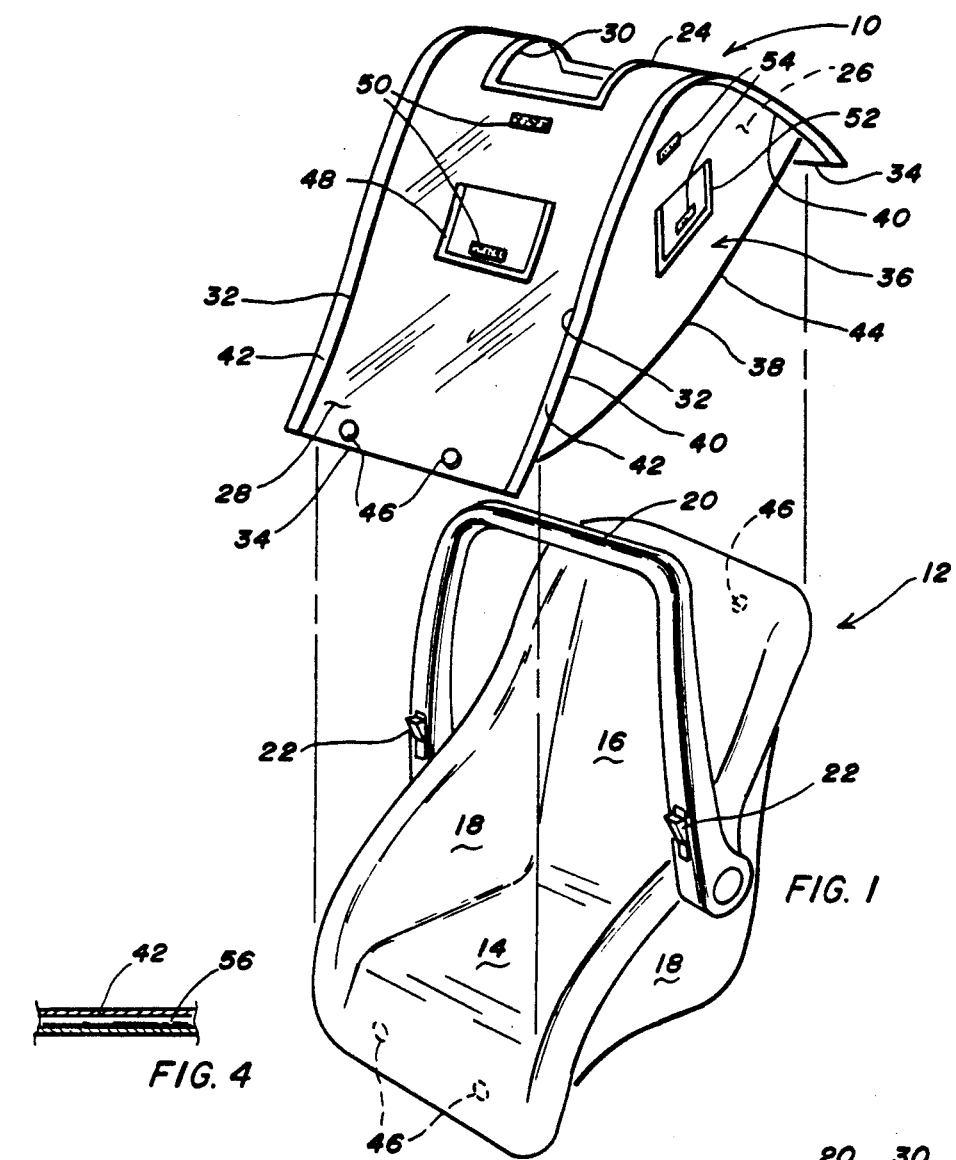
FIG. 1
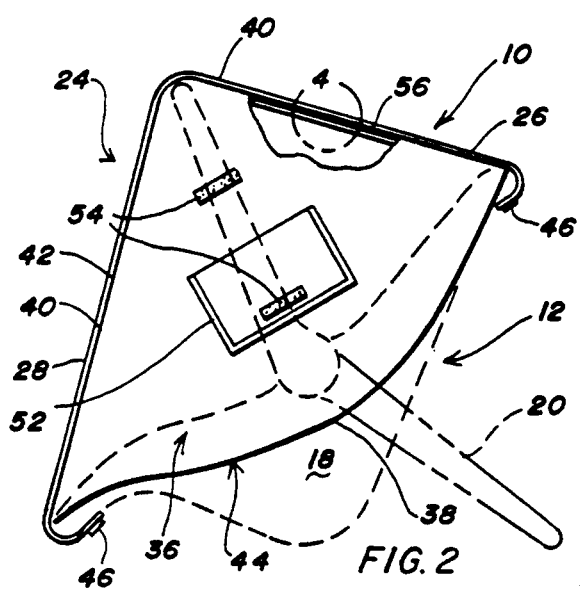
FIG. 4
FIG. 2
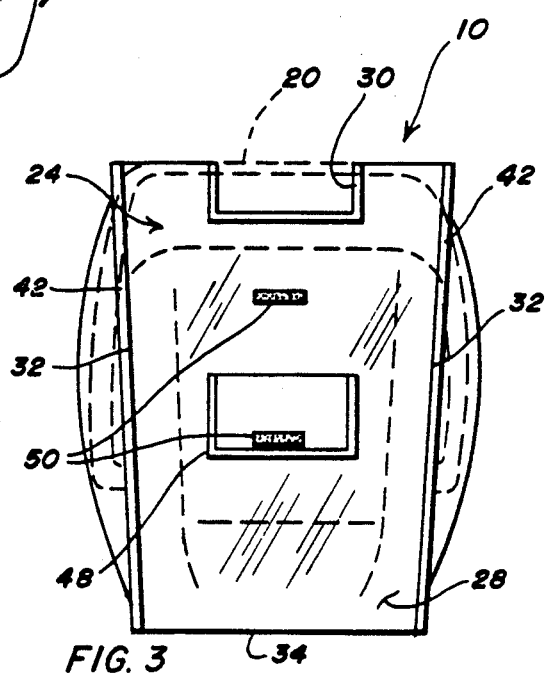
FIG. 3

WEATHER SHIELD FOR INFANT'S SEAT

BACKGROUND OF THE INVENTION

With present day seats for transporting infants, no equipment is provided to protect a baby from the weather, such as wind, rain or snow. In bad weather, it is usual practice to throw a blanket loosely over the baby but this method has a number of serious disadvantages including that the blanket may be blown off or get wet. In addition, the baby may feel confined and try to throw the blanket off.

SUMMARY OF THE INVENTION

In view of the above, there is a need for an effective weather shield for use with an infant's seat. Such a shield should be easy to use and comfortable for the baby. It is therefore an object of the present invention to provide such a weather shield. Other objects and features of the invention will be in part apparent and in part pointed out hereinafter. The invention accordingly comprises the constructions hereinafter described and their equivalents, the scope of the invention being indicated in the subjoined claims.

More particularly, the invention comprises a weather shield for protecting a baby from the elements for use in connection with an infant's seat having a lower seat portion, a back, opposing sides formed along the edges of the lower seat portion and a U-shaped arm forming a carrying handle attached to the sides. The weather shield includes an elongated panel having a top section and a front section adapted to drape over the infant's seat and be supported by the U-shaped arm. The elongated panel has two longer and two shorter sides and is formed of sheet material that is capable of shedding water, with at least the front section being transparent such that the baby can see and be seen therethrough. A pair of opposing generally triangular side panels have a longer and two shorter sides. The side panels are attached along their shorter sides to the longer sides of the elongated panel. The shorter sides of the elongated panel and the longer side of the side panels form a bottom edge of the weather shield which is adapted to slip over the infant's seat and extend around the lower seat portion and the back and demountably attach thereto.

BRIEF DESCRIPTION OF THE DRAWINGS

In the accompanying drawings, in which one of various possible embodiments of the invention is illustrated, corresponding reference characters refer to corresponding parts throughout the several views of the drawings and in which:

FIG. 1 is a perspective view of a weather shield in accordance with the present invention exploded from an infant's seat to which it can be attached;

FIG. 2 is a side elevation of a weather shield attached to an infant's seat;

FIG. 3 is a front elevation of the weather shield attach to an infant's seat; and, FIG. 4 is fragmentary sectional view taken along line 4—4 in FIG. 2.

DETAILED DESCRIPTION OF THE INVENTION

Referring to the drawings more particularly by reference character, reference numeral 10 indicates a weather shield designed and adapted for use in connection with an infant's seat 12 such as a carrier seat, car seat or related device.

As illustrated, infant seat 12 is a baby carrier, of a well known type, formed as a shell into which an infant is seated. Seat 12 includes a lower seat portion 14, serving to support the legs and lower torso of the infant. A back 16 extends upwardly beyond the head of the infant, serving to support its head and upper torso. Opposing sides 18 are formed along the edges of the lower seat portion 14 and back 16, completing the shell of the seat. A U-shaped arm 20 forming a handle is pivotally attached to sides 18 and is locked in selected position by a locking means 22. As shown in FIG. 2, handle 20 can be pivoted between upper and lower extremes for use as a carrying handle or as a brace for keeping the seat in upright condition when it is sat upon a generally horizontal surface.

Weather shield 10 includes an elongated rectangular panel 24 forming a top section 26 over the infant and a front section 28 through which it can see. Top section 26 extends above back 16 a sufficient distance that the child's head will not bump the inner surface and front section 28 extends above lower seat portion 14 a sufficient distance that sections 26 and 28 drape over and are supported by handle 20 when it is in the position shown in FIG. 1. An aperture 30 is provided in panel 24 at the junction between top section 26 and front section 28 through which arm 20 can be accessed. Aperture 30 is sized (but preferably not oversized) such that an adult hand can easily pass through the hole and grip arm 20 as a carrying handle for use of the carrier in the usual manner.

Panel 24 has two longer side edges 32 and two shorter side edges 34. It is preferably made of a suitable transparent or translucent sheet material which is capable of shedding water such as vinyl or similar plastic or synthetic material that is relatively lightweight and easy to clean and store away. It is preferred that front section 28 be transparent so that the baby has clear view of the world and his parent (or other care giver) has a clear view of the baby. The sheet material forming section 26 and/or 28 of panel 24 can be tinted to shade the baby for comfort and to protect the baby from the bright glare of the sun and from ultraviolet rays which can harm the baby's skin and eyes.

Weather shield 10 further includes a pair of opposing side panels 36. Side panels 36 are generally triangular in shape having a longer 38 and two shorter sides 40. Side panels 36 are symmetrical to each other and are attached along sides 40 in seams 42 to the longer side edges 32 of panel 24.

Side panels 36 can be made of the same material as panel 24. They may also (and in most cases are preferably) formed of some other flexible plastic material of a color sufficiently dark to absorb an appreciable portion of sunlight incident thereon to protect the child from exposure to sunlight and resultant discomfort from excessive heat. For winter use, panels 36 are preferably capable of shedding water but may be woven and made air pervious (e.g. GORE-TEX). For summer use, on the other hand, panels 36 may be made of netting to protect the baby from flies, mosquitoes and so forth and to allow for free circulation of air.

Sides 38 of panels 36 and sides 34 of panel 24 form a bottom edge 44 of weather shield 10. Bottom edge 44 is open to allow weather shield 10 to be slipped over the top of the carrier. Weather shield 10 is adapted to fit and completely cover infant's seat 12, extending around lower seat portion and back 16 and over opposing sides 18, so as to not only amply protect the baby during inclement weather, but also prevent lower seat portion 14, back 16 and opposing sides 18 in their entirety from becoming wet by rain or the like.

Weather shield 10 is demountably attached to infant's seat 12 along shorter sides 34 of panel 24 which are adapted to wrap around a top edge of back 16 and a front edge of lower seat portion 14 via attachment means 46. Suitable attachment means 46 include snaps, loop and pile fasteners (e.g. VELCRO), elastic and so forth. As shown in FIGS. 1-2, attachment means 46 are snaps, interengaging portions of which are attached at appropriate positions on panel 24 near sides 34 with mating portions attached to infant's seat 12.

An aperture 48 illustrated as a flap can be provided in front section 28 to enable a person to give the baby a nursing bottle or other article without requiring the removal of the weather shield from the carrier, car seat or the like. A fastener 50 such as a loop and pile fastener can be provided on flap 48 such that it can be detachably secured to front section 28 in open condition. Other apertures 52 can be provided in side panels 36 either for access or for ventilation. These apertures, like aperture 48, are illustrated as flaps with fasteners 54 for securing the flap to side panels 36 in open position. If weather shield 10 is to be used when infant's seat 12 is sat upon a generally horizontal surface, seams 42 can be stiffened with rods 56 best seen in FIG. 4. This is necessary as it is clear that U-shaped handle 20 is not available to support the weather shield with infant's seat 12 in that position. Rods 56 may be bent in a "V" and follow the contour of seam 42 between the top edge of back 16 and the front edge of lower seat portion 14. Alternatively, rods 56 may be sectioned, one section fitting in that portion of seam 42 along the side edges of top section 26 and another rod section fitting in that portion of seam 42 along the side edges of front section 28. Sectioned rods 56 facilitate folding weather shield 10 into a compact bundle and is therefore advantageous.

In accordance with the invention, weather shield 10 is made from a plurality of pieces, properly cut into panel 24 and side panels 36, and joined at seams 42 by sewing, sonic welding and so forth. Rods 56, if present, are inserted in seams 42 or provision is made for their later insertion by the user. Attachment means 46 are joined to panel 24 near sides 34, mating portions of which are provided for attachment to infant's seat 12. Apertures 48 are 52, if present, are formed with fasteners 50 and 54, if present, on weather shield 10.

In use, bottom edge 44 of weather shield 10 is easily slipped over infant's seat 12 and secured thereto by attachment means 46. By reversing the procedure, the weather shield can be easily removed from the carrier which will enable a person to quickly pick up the baby. When the weather shield is in place, the baby can see out of and be seen through front section 28 and is protected from wind, rain or snow. Displacement of weather shield 10 by wind or other means is practically impossible due to the fitting association of the weather shield with the carrier. Weather shield 10 is out of reach of the baby, which is an important consideration given an infant's penchant from grasping and pulling anything within reach. Similarly, the weather shield cannot be kicked off by the baby, nor is there much cause for the baby to want to displace the cover since it can see out and is not confined like being covered with a blanket.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A weather shield formed of flexible sheet material for protecting a baby from the elements in combination with an infant's seat having a lower seat portion, a back, opposing sides formed along the edges of the lower seat portion and a U-shaped arm forming a carrying handle attached to the sides, comprising:

an elongated panel having a top section and a front section draped over the infant's seat and supported by the U-shaped arm, said elongated panel having two longer and two shorter sides and including access means through which the U-shaped arm of the infant's seat can be accessed located in the elongated panel between said longer and shorter sides, said elongated panel being formed of sheet material which is capable of shedding water with at least the front section being transparent such that the baby can see and be seen therethrough; and, a pair of opposing generally triangular side panels having a longer and two shorter sides, said side panels attached along their shorter sides to the longer sides of the elongated panel, said shorter sides of the elongated panel and the longer side of the side panels forming a bottom edge of the weather shield which is sized to slip over the infant's seat and to extend around the lower seat portion and the back and demountable attach thereto.

2. The weather shield of claim 1 wherein the weather shield is demountably attached to the infant's seat with snaps.

3. The weather shield of claim 1 wherein the weather shield if demountably attached to the infant's seat with loop and pile fasteners.

4. The weather shield of claim 1 wherein the side panels are sufficiently dark to absorb an appreciable portion of sunlight incident thereon.

5. The weather shield of claim 4 wherein the elongated panel is tinted to protect the baby from bright glare of the sun and from ultraviolet rays.

6. The weather shield of claim 1 wherein said side panels attached to the elongated panel along seams which are stiffened with rods for support of the weather shield in place of the U-shaped arm.

7. The weather shield of claim 1 wherein an aperture is provided in at least one of the side panels to access the baby.

8. The weather shield of claim 1 wherein an aperture is provided in the front section of the elongated panel to access the baby.

* * * * *